US012598059B1

(12) United States Patent
Stapleton

(10) Patent No.: US 12,598,059 B1
(45) Date of Patent: Apr. 7, 2026

(54) END-TO-END TRANSPORT LAYER SECURITY

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 167 days.

(21) Appl. No.: 18/099,109

(22) Filed: Jan. 19, 2023

(51) Int. Cl.
*H04L 9/08* (2006.01)

(52) U.S. Cl.
CPC .......... *H04L 9/0819* (2013.01); *H04L 9/0841* (2013.01); *H04L 9/0855* (2013.01)

(58) Field of Classification Search
CPC ... H04L 63/0428; H04L 63/08; H04L 63/061; H04L 67/02; H04L 67/306; H04L 63/0861; H04L 63/102; H04L 65/60; H04L 9/0819; G06F 21/10; G06F 21/602; G06F 2221/2107; G06F 17/30867; G06F 21/105; H04N 21/4627; H04N 21/84; H04N 21/2353; H04N 21/2387; H04N 21/25816; H04N 21/233; H04N 21/23439; H04N 21/2393; H04N 21/4126; H04N 21/41407; G06N 3/08
USPC ........ 713/171, 150, 163, 181; 726/2, 21, 36; 380/255, 264, 276, 5
See application file for complete search history.

(56) References Cited

U.S. PATENT DOCUMENTS

| | | | | |
|---|---|---|---|---|
| 7,587,598 B2 * | 9/2009 | Ohba | ...................... | H04L 63/08 |
| | | | | 713/169 |
| 7,917,758 B2 * | 3/2011 | Palekar | ................... | H04L 63/08 |
| | | | | 709/227 |
| 8,843,738 B2 * | 9/2014 | Vos | ......................... | H04L 69/22 |
| | | | | 709/224 |
| 9,026,784 B2 * | 5/2015 | Buruganahalli | ........ | H04L 63/20 |
| | | | | 713/176 |
| 9,608,963 B2 * | 3/2017 | Lu | ........................ | H04L 63/0464 |
| 10,009,183 B2 * | 6/2018 | Pahl | ...................... | H04L 9/3247 |
| 10,162,943 B2 * | 12/2018 | Park | ........................ | H04L 63/08 |
| 11,502,830 B2 * | 11/2022 | Cannon | ................. | H04L 9/0819 |
| 2003/0174842 A1 * | 9/2003 | Challener | ............ | H04L 63/061 |
| | | | | 380/277 |
| 2005/0132204 A1 * | 6/2005 | Gouguenheim | ........ | G06F 21/10 |
| | | | | 713/193 |
| 2007/0057048 A1 * | 3/2007 | Plotkin | ............... | H04L 63/0428 |
| | | | | 235/382 |
| 2008/0109642 A1 * | 5/2008 | Beutler | ............... | G06F 11/1637 |
| | | | | 712/225 |

(Continued)

*Primary Examiner* — Sharif E Ullah
(74) *Attorney, Agent, or Firm* — Foley & Lardner LLP

(57) ABSTRACT

The present disclosure relate to exchanging information between a start node and an end node. Based on the information session keys for a connection comprising the start node, the end node, and at least one intermediate node are established. The session keys include a data encryption session key and a Message Authentication Code (MAC) session key. The data is encrypted using the data encryption session key at the start node. MAC is generated using the MAC session key. The encrypted data is relayed, via the at least one intermediate node, from the start node to the end node without the at least one intermediate node re-encrypting the data.

20 Claims, 3 Drawing Sheets

(56)  References Cited

U.S. PATENT DOCUMENTS

| | | | | |
|---|---|---|---|---|
| 2009/0328177 | A1* | 12/2009 | Frey | H04L 9/3213 |
| | | | | 726/9 |
| 2010/0017615 | A1* | 1/2010 | Boesgaard | G06F 21/606 |
| | | | | 713/176 |
| 2010/0257578 | A1* | 10/2010 | Shukla | G06F 21/6218 |
| | | | | 726/1 |
| 2011/0145581 | A1* | 6/2011 | Malhotra | H04L 9/3271 |
| | | | | 725/91 |
| 2012/0324552 | A1* | 12/2012 | Padala | H04L 9/3213 |
| | | | | 726/6 |
| 2013/0198509 | A1* | 8/2013 | Buruganahalli | H04L 63/1408 |
| | | | | 713/151 |
| 2013/0219178 | A1* | 8/2013 | Xiques | H04L 65/70 |
| | | | | 713/168 |
| 2013/0318358 | A1* | 11/2013 | Wang | H04L 9/0866 |
| | | | | 713/182 |
| 2014/0079221 | A1* | 3/2014 | McCallum | H04L 9/0822 |
| | | | | 380/277 |
| 2014/0331297 | A1* | 11/2014 | Innes | H04L 63/0884 |
| | | | | 726/7 |
| 2015/0222697 | A1* | 8/2015 | Bassiouny | H04L 65/65 |
| | | | | 709/203 |
| 2017/0316185 | A1* | 11/2017 | Park | G06F 21/105 |
| 2020/0058341 | A1* | 2/2020 | Villa | G11C 11/2257 |
| 2022/0060450 | A1* | 2/2022 | Slovetskiy | H04L 67/142 |

* cited by examiner

Figure 2:
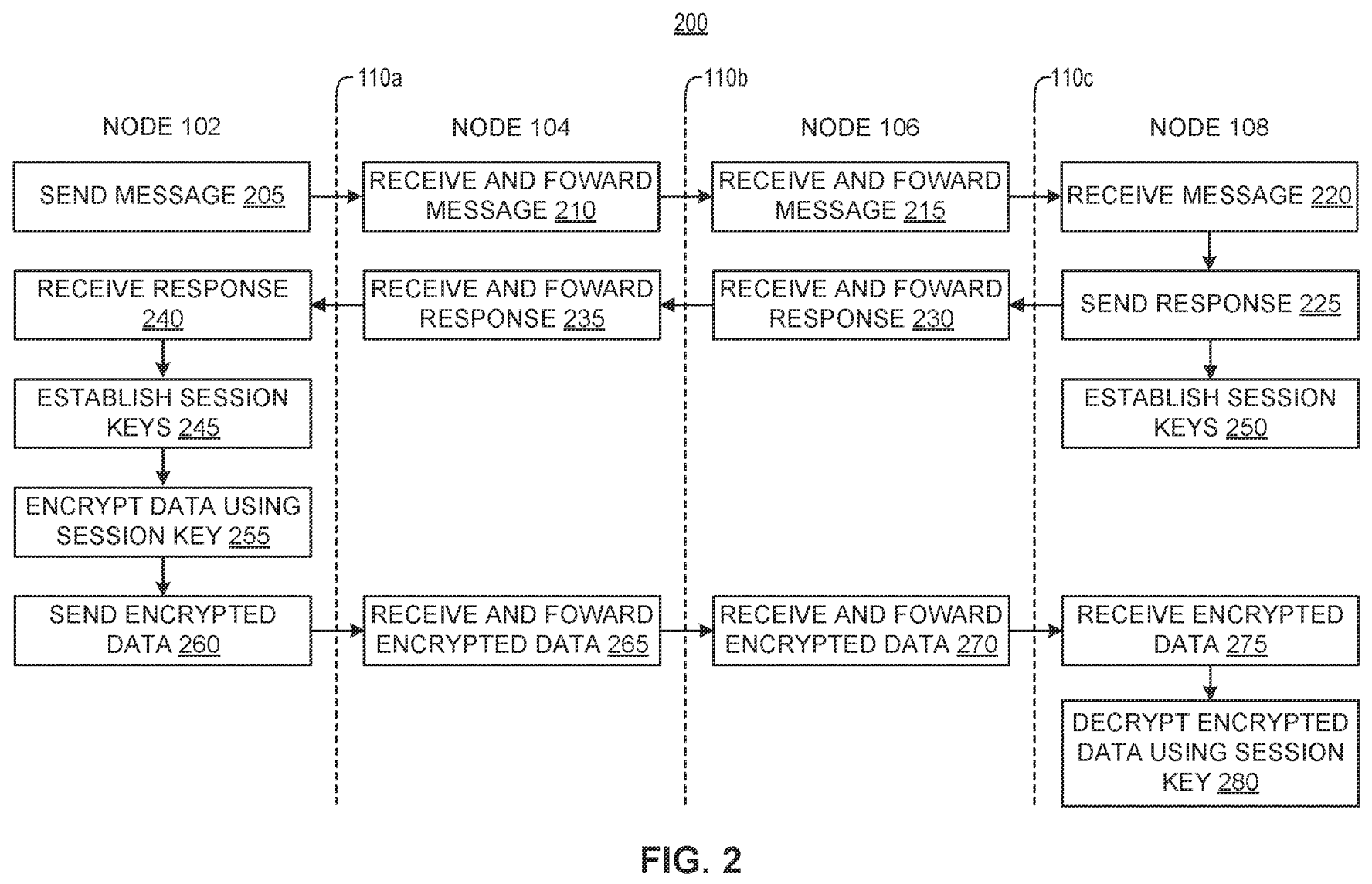

200

NODE 102

SEND MESSAGE 205

RECEIVE RESPONSE 240

ESTABLISH SESSION KEYS 245

ENCRYPT DATA USING SESSION KEY 255

SEND ENCRYPTED DATA 260

110a

NODE 104

RECEIVE AND FOWARD MESSAGE 210

RECEIVE AND FOWARD RESPONSE 235

RECEIVE AND FOWARD ENCRYPTED DATA 265

110b

NODE 106

RECEIVE AND FOWARD MESSAGE 215

RECEIVE AND FOWARD RESPONSE 230

RECEIVE AND FOWARD ENCRYPTED DATA 270

110c

NODE 108

RECEIVE MESSAGE 220

SEND RESPONSE 225

ESTABLISH SESSION KEYS 250

RECEIVE ENCRYPTED DATA 275

DECRYPT ENCRYPTED DATA USING SESSION KEY 280

<u>310</u>
EXCHANGE INFORMATION BETWEEN START NODE AND END NODE

<u>320</u>
ESTABLISH BASED ON INFORMATION SESSION KEYS FOR CONNECTION
INCLUDING START NODE, END NODE, AND AT LEAST ONE INTERMEDIATE NODE

<u>330</u>
ENCRYPT AT START NODE USING DATA ENCRYPTION SESSION KEY

<u>340</u>
GENERATE AT START NODE MAC USING MAC SESSION KEY

<u>350</u>
RELAY, VIA AT LEAST ONE INTERMEDIATE NODE, ENCRYPTED DATA FROMS
TART NODE TO END NODE WIHTOUT AT LEAST ONE INTERMEDIATE NODE RE-
ENCRYPTING DATA

FIG. 3

END-TO-END TRANSPORT LAYER SECURITY

BACKGROUND

Transport Layer Security (TLS) and its predecessor Secure Socket Layer (SSL) are security protocols that provide Point-to-Point (P2P) data protection. P2P protection refers to two communicating nodes, e.g., a first communication node and a second communication node, exchange public keys to establish two session keys, a Data Encryption Key (DEK) and a Message Integrity Key (MIK). The MIK is typically used for keyed Hash-based Message Authentication Code (HMAC). TLS offers several key establishment schemes.

SUMMARY

[Finalize when Jeff Approves the Claims]

These and other features, together with the organization and manner of operation thereof, will become apparent from the following detailed description when taken in conjunction with the accompanying drawings.

BRIEF DESCRIPTION OF THE DRAWINGS

FIG. 2 is a method for performing TLS-based communications, according to various arrangements.

FIG. 3 is a method 300 for performing communication connection-based or channel-based communications, according to various arrangements.

DETAILED DESCRIPTION

Figure 1:
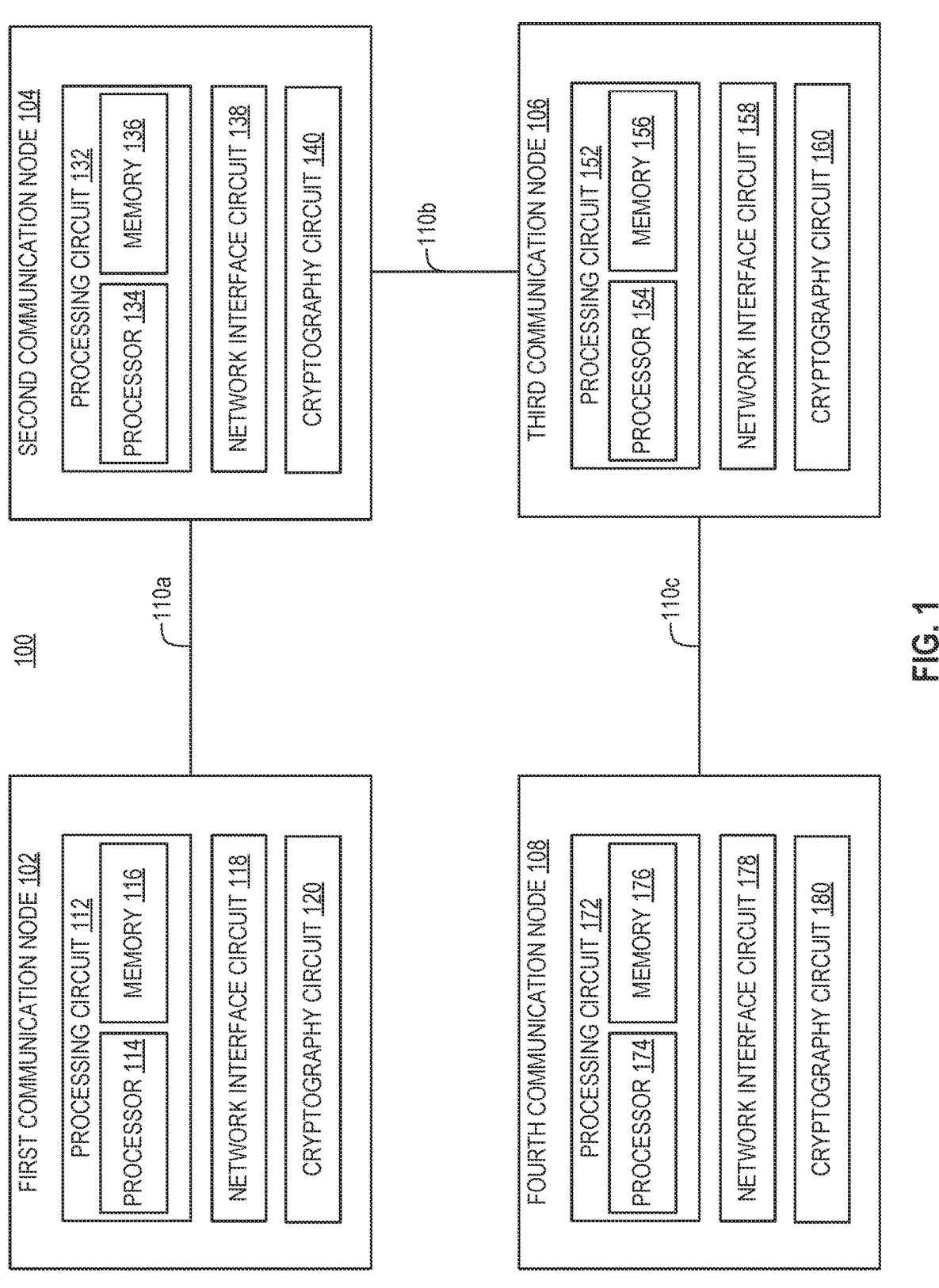
FIG. 1 is a block diagram of a system configured to implement End-to-End (E2E) TLS, according to some arrangements.

A TLS can implement various key establishment schemes, including Rivest, Shamir, and Adleman (RSA) key transport, Diffie-Hellman (DH) key agreement, Elliptic Curve Diffie-Hellman (ECDH) key agreement, and ephemeral DH key agreement (DHE) or ECDH with ephemeral keys (ECDHE) key agreement. TLS supports static public key certificates and ephemeral public keys, but TLS 1.3 only allows ephemeral keys. The recipient (TLS client) of a public key certificate performs certificate validation to trust the sender (TLS server) public key. The TLS server will perform certificate validate only for client authentication. An ephemeral key has a short time-to-live (e.g., within seconds) that public key certificates are not practical, but typically the sender ephemeral key is signed and verified using the TLS server certificate. TLS will be updated to address the National institute of Standards and Technology (NIST) Post-Quantum Cryptography (PQC) algorithms. Regardless of the key establishment scheme, TLS is a P2P scheme between two communication nodes.

In a typical P2P TLS scheme for connections between four communication nodes (A, B, C, and D) using DH, three TLS sessions are established. A first TLS session is established between nodes A and B to establish session keys $S_{AB}$. A second TLS session is established between nodes B and C to establish session keys $S_{BC}$. A third TLS session is established between and nodes C and D to establish session keys $S_{CD}$. For data encryption from communication nodes A, B, C, and D, six operations are implemented. For example, node A encrypts data using $S_{AB}$ and sends the encrypted data to node B. Node B decrypts the data using $S_{AB}$, re-encrypts data using $S_{BC}$, and sends re-encrypted data to node C. Node C decrypts the data using $S_{BC}$, re-encrypts data using $S_{CD}$, and sends the re-encrypted data to node D. Node D decrypts data using $S_{CD}$. In this example, six cryptographic operations are performed in a P2P TLS scheme including four nodes. For a P2P TLS scheme including three nodes, four cryptographic operations are performed. The separate TLS connections between the nodes conventionally require each intermediate node to decrypt the inbound data and re-encrypt the outbound data Accordingly, the number of cryptographic operations for a conventional P2P TLS scheme is 2+2 (N−2), where N is the number of nodes in the P2P TLS scheme.

Referring generally to the FIGS., apparatuses, systems, methods, and non-transitory computer-readable media described herein relate to E2E TLS schemes. As compared to P2P TLS schemes, E2E TLS schemes improve the speed and efficiency in communications between communication nodes and reduce risk of data disclosure. The E2E TLS schemes can employ key establishment schemes and symmetric cryptography. The E2E TLS schemes reduce intermediary decrypt and re-encrypt functions of intermediary communication nodes of the TLS connection, thus reducing the risk of intermediary access to cleartext data in between the decrypt and re-encrypt functions at the intermediate nodes. Accordingly, the overhead in performing cryptographic functions (e.g., encrypt, decrypt, generate Message Authentication Code (MAC), verify MAC, and so on) and in establishing session keys between communication nodes in a TLS connection can be improved.

FIG. 1 is a block diagram of a system 100 configured to implement an E2E TLS scheme, according to some arrangements. The system 100 includes at least a first communication node 102, a second communication node 104, a third communication node 106, and a fourth communication node 108. In some arrangements, the communication nodes 102, 104, 106, and 108 can be Internet-connected or network-connected computing devices such as computers, servers, mobile devices, datacenters, smartphones, smart wearables, etc. The communication nodes 102, 104, 106, and 108 can include any type of device or system configured to execute one or more software applications. In some arrangements, each of the communication nodes 102, 104, 106, and 108 can include an operating system (e.g., Windows, Linux, MAC OS, etc.) on which the software applications can be executed. Examples of the communication nodes 102, 104, 106, and 108 can include routers, firewalls, load balancers, network appliances, servers, databases, and so on. For example, the first communication node 102 can be a first application server. The second communication node 104 is a network load balancer that balances the load of incoming traffic and selects the third communication node 106. The third communication node 106 can be a proxy server that can select the fourth communication node 108 to be the end point of the TLS connection. The fourth communication node 108 can be a second application server or a database. The nodes 102 and 108 cannot communicate directly For example, the first communication node 102 may be a device connected to the second communication node 104 through the internet (e.g., a public connection), and the nodes 104 and 106 may be in a Demilitarized Zone (DMZ) of an enterprise, and the fourth communication node 108 may be a device within an internal network of the nodes 104, 106, and 108. In other words, the nodes 102 and 108 can only communicate indirectly via the TLS connection due to network architecture and security.

The communication nodes 102, 104, 106, and 108 are on a path defined by a TLS connection. The TLS connection starts at a start node (the first communication node 102), passes through intermediate nodes (the second and third communication nodes 104 and 106), and ends at an end node (the fourth communication node 108). Encrypted data can be moved in the TLS connection, from the first communication node 102 to the second communication node 104 via a connection 110a, from the second communication node 104 to the third communication node 106 via a connection 110b, from the third communication node 106 to the fourth communication node 108 via connection 110c. The start node in a TLS connection is the node from which the data originates, and the start node is node that first encrypts the data. The start node is the first TLS client sending the initial Client Hello message to the TLS server. The end node in a TLS connection is the TLS server and the node intended by the start node to receive the data. The end node decrypts the encrypted data and performs certain processes using the data. The TLS connection includes one or more intermediate nodes that passes, forwards, or relays the encrypted data originating from the start node (e.g., received from the start node or another intermediate node) to another intermediate node or the end node, without decrypting the data, without re-encrypting the data, without verifying the MAC, and without re-generating MAC. An intermediate node acts as both a TLS client and a TLS server. In some examples, the end node can generate additional data in the processes performed using the data originating from the start node, encrypt the additional data, and send the encrypted additional data to the start node via at least one intermediate node. In this case, the end node is the start node, and the start node is the end node. Examples of data include values, instructions, notifications, parameters, and so on.

Each of the communication nodes 102, 104, 106, and 108 includes a processing circuit 112, 132, 152, or 172, respectively. A processing circuit 112, 132, 152, or 172 includes a processor 114, 134, 154, or 174 and a memory 116, 136, 156, or 176, respectively. Each processor 114, 134, 154, or 174 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. Each memory 116, 136, 156, or 176 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, each memory 116, 136, 156, or 176 is or includes tangible, non-transient volatile memory or non-volatile memory. Accordingly, each memory 116, 136, 156, or 176 includes database components, object code components, script components, or any other type of information structure for supporting the various activities and information structures described herein. The processing circuit 112 can be used to implemented one or more of the circuits 118 and 120. The processing circuit 132 can be used to implemented one or more of the circuits 138 and 140. The processing circuit 152 can be used to implemented one or more of the circuits 158 and 160. The processing circuit 172 can be used to implemented one or more of the circuits 178 and 180.

In some examples, the processing circuit 112 of the first communication node 102 can execute an application or software that generates the data intended for the fourth communication node 108 (end node) or needs the data to be sent to the fourth communication node 108 via the TLS connection (e.g., via the intermediate nodes 104 and 106). In some examples, the processing circuit 172 of the fourth communication node 108 can execute an application or software that receives the data originating from the first communication node 102 (start node), processes such data, and in some cases generate additional new data to be sent to the first communication node 102 via the TLS connection. Examples of the application or software include email, instant messaging, database, web browser, applications or software over the Internet or World Wide Web, and so on.

Each of the communication nodes 102, 104, 106, and 108 includes a network interface circuit 118, 138, 158, or 178, respectively. Each network interface 118, 138, 158, or 178 is configured for and structured to establish a connection and communicate with another network interface of another communication node via the connection 110a, 110b, or 110c. The network interface circuits 118, 138, 158, or 178 are structured for sending and receiving data over one or more communication networks. Accordingly, each of the network interface circuits 118, 138, 158, and 178 includes any of a cellular transceiver (for cellular standards), wireless network transceiver (for 802.11X, ZigBee, Bluetooth, Wi-Fi, or the like), wired network interface, or a combination thereof. For example, each of the network interface circuits 118, 138, 158, and 178 can include wireless or wired network modems, ports, baseband processors, and associated software and firmware. The network interface circuit 118 can send data to the network interface circuit 138 via the connection 110a, vice versa. The network interface circuit 138 can send data to the network interface circuit 158 via the connection 110b, vice versa. The network interface circuit 158 can send data to the network interface circuit 178 via the connection 110c, vice versa.

Each of the connections 110a, 110b, and 110c can be a network such as any suitable Local Area Network (LAN), Wide Area Network (WAN), or a combination thereof. For example, the network 110 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1 x), General Packet Radio Service (GPRS), Personal Communications Service (PCS), 802.11X, ZigBee, Bluetooth, Wi-Fi, any suitable wired network, combination thereof, and/or the like. In some examples, the connection 110a may be through the Internet via suitable protocol such as Hypertext Transfer Protocol Secure (HTTPS) is an extension of the Hypertext Transfer Protocol (HTTP), or so on. the connections 110b and 100c may be internal connections or networks within an enterprise.

Each of the communication nodes 102, 104, 106, and 108 includes a cryptography circuit 120, 140, 160, or 180, respectively, for performing cryptographic operations. For example, each of the cryptography circuit 120, 140, 160, and 180 can encrypt data, decrypt data, and generate or otherwise obtain keys in the manner described herein.

While various circuits, interfaces, and logic with particular functionality are shown, it should be understood that each of the communication nodes 102, 104, 106, and 108 includes any number of circuits, interfaces, and logic for facilitating the operations described herein. For example, the activities of multiple circuits are combined as a single circuit and implemented on the same processing circuit (e.g., the processing circuit), as additional circuits with additional functionality are included.

FIG. 2 is a method 200 for performing TLS-based communications, according to various arrangements. Referring to FIGS. 1 and 2, the method 200 can be performed by the system 100, including the communication nodes 102, 104, 106, and 108. The TLS connection is established among the communication nodes 102, 104, 106, and 108 as described herein.

At 205, the first communication node 102 (e.g., the network interface circuit 118) sends a message 205 to the second first communication node 102 via the connection 110*a*. At 210, the second communication node 104 (e.g., the network interface circuit 138) receives the message originating from the first communication node 102 via the connection 110*a* and forwards the same message to the third communication node 106 via the connection 110*b*. At 215, the third communication node 106 (e.g., the network interface circuit 158) receives, from the second communication node 104 via the connection 110*b*, the message originating from the first communication node 102 and forwards the same message to the fourth communication node 108 via the connection 110*c*. At 220, the fourth communication node 108 (e.g., the network interface circuit 178) receives, from the third communication node 106 via the connection 110*c*, the message originating from the first communication node 102.

In some examples in which DH key agreement or ECDH key agreement is used to establish keys for the TLS connection, the message originally sent by the start node (e.g., the first communication node 102) and forwarded or relayed by the intermediate nodes (e.g., the communication nodes 104 and 106) to the end node (e.g., the fourth communication node 108) includes a public key of the first communication node 102.

In some examples in which ephemeral key agreement is used to establish keys for the TLS connection, the message originally sent by the start node (e.g., the first communication node 102) and forwarded or relayed by the intermediate nodes (e.g., the communication nodes 104 and 106) to the end node (e.g., the fourth communication node 108) includes an ephemeral key of the first communication node 102. In some examples in which ephemeral key agreement is used to establish keys for the TLS connection, the message originally sent by the start node (e.g., the first communication node 102) and forwarded or relayed by the intermediate nodes (e.g., the communication nodes 104 and 106) to the end node (e.g., the fourth communication node 108) includes an ephemeral key of the first communication node 102 and a public key of the first communication node 102.

At 225, the fourth communication node 108 (e.g., the network interface circuit 178) sends a response to the third communication node 106 via the connection 110*c*. At 230, the third communication node 106 (e.g., the network interface circuit 158) receives the response via the connection 110*c* and forwards the same response to the second communication node 104 via the connection 110*b*. At 235, the second communication node 104 (e.g., the network interface circuit 138) receives, from the third communication node 106 via the connection 110*b*, the response originating from the fourth communication node 106 and forwards the same response to the first communication node 102 via the connection 110*a*. At 240, the first communication node 102

(e.g., the network interface circuit 118) receives, from the second communication node 104 via the connection 110*a*, the message originating from the fourth communication node 108.

In some examples in which DH key agreement or ECDH key agreement is used to establish keys for the TLS connection, the response originally sent by the end node (e.g., the fourth communication node 108) and forwarded or relayed by the intermediate nodes (e.g., the communication nodes 104 and 106) to the start node (e.g., the first communication node 102) includes a public key of the fourth communication node 108. In some examples in which ephemeral key agreement is used to establish keys for the TLS connection, the response originally sent by the end node (e.g., the fourth communication node 108) and forwarded or relayed by the intermediate nodes (e.g., the communication nodes 104 and 106) to the start node (e.g., the first communication node 102) includes an ephemeral key of the fourth communication node 108. In some examples in which ephemeral key agreement is used to establish keys for the TLS connection, the response originally sent by the end node (e.g., the fourth communication node 108) and forwarded or relayed by the intermediate nodes (e.g., the communication nodes 104 and 106) to the start node (e.g., the first communication node 102) includes an ephemeral key of the fourth communication node 108 and a public key of the fourth communication node 108.

In some examples, a TLS session handshake includes 205-240. The message relayed to the fourth communication node 108 in 205-220 can be referred to as a notification, acknowledgement, or client "hello." The response relayed to the first communication node in 225-240 can be referred to as an acknowledgement or server "hello." The TLS session handshake can be performed for each communication session (e.g., defined by a length of time or other conditions) between the nodes 102 and 108. Accordingly, 205-240 allow the first communication node 102 and the fourth communication node 108 to exchange their respective public keys and/or ephemeral keys under the DH key agreement, ECDH key agreement, or the ephemeral key agreement. The public keys and/or ephemeral keys of the nodes 102 and 108 can be used to establish session keys for the TLS connection. For example, the communication nodes 102 and 108 can establish session keys for the TLS connection at 245 and 250, respectively. In some examples, 245 and 250 can be performed for each communication session between the nodes 102 and 108.

In the examples in which the nodes 102 and 108 use DH key agreement to establish the session keys, the nodes 102 and 108 exchange their respective public keys in 205-240 as described. That is, the first communication node 102 sends its public key via the nodes 104 and 106 to the fourth communication node 108 via 205-220, and the fourth communication node 108 sends its public key via the nodes 104 and 106 to the first communication node 102 via 225-240. The cryptography circuit 120 of the first communication node 102 and the cryptography circuit 180 of the fourth communication node 108 generate a shared secret. For example, the cryptography circuit 120 of the first communication node 102 uses its own private key and the public key of the fourth communication node 108 to compute the shared secret. The cryptography circuit 180 of the fourth communication node 108 uses its own private key and the public key of the first communication node 102 to compute the shared secret using the DH group algebra shown in expressions (1)-(4). In some arrangements, the cryptography circuit 120 of the first communication node 102 generates a random number a as the private key of the first communication node 102 and computes the public key A of the first communication node 102 using:

$$A = g^a \bmod p \qquad (1);$$

where g and p are DH-domain parameters.

The cryptography circuit 180 of the fourth communication node 108 generates a random number b as the private key of the fourth communication node 108 and computes the public key B of the fourth communication node 108 using:

$$B = g^b \bmod p \qquad (2);$$

where g and p are the same DH-domain parameters in (1).

The cryptography circuit 120 of the first communication node 102 can compute the shared secret $B^a$ using:

$$B^a = (g^a \bmod p)^a = g^{ba} \bmod p = g^{ab} \bmod p \qquad (3).$$

The cryptography circuit 180 of the fourth communication node 108 can compute the shared secret $A^b$ using:

$$A^b = (g^a \bmod p)^b = g^{ab} \bmod p = g^{ba} \bmod p \qquad (4).$$

The cryptography circuits 120 and 180 can each run a key derivation function using the computed shared secret to generate session keys at 245 and 250. For example, the two session keys can include a key used for encryption and decryption, and a key used for MAC generation and verification.

In the examples in which the nodes 102 and 108 use ECDH key agreement to establish the session keys, the nodes 102 and 108 exchange their respective public keys in 205-240 as described. The EDCH key agreement is similar to the DH key agreement scheme, except that Elliptic Curve Cryptography (ECC) math equivalent of group algebra instead of the DH group algebra shown with respect to expressions (1)-(4).

In the examples in which the nodes 102 and 108 use ephemeral key agreement to establish the session keys, the nodes 102 and 108 exchange their respective ephemeral keys in addition to or replacing the static public keys in 205-240 as described. The ephemeral key agreement can support both DH and ECDH. For example, ANSI X9.42 DH and X9.63 EDCH allow the first communication node 102 to use static public key, ephemeral key, or both, and allow the fourth communication node 108 to use static public key, ephemeral key, or both in establishing the session keys. In some examples, the Internet Engineering Task Force (IETF) specification RFC 4492 supports only ephemeral keys and repurposes existing RSA certificate of the fourth communication node 108 to sign the ephemeral public key of the fourth communication node 108.

Accordingly, the first communication node 102 can send information to the fourth communication node 108 to establish the session keys via the connections 110a, 110b, and 110c and relayed by the intermediate nodes 104 and 106, in that order, as described at 205, 210, 215, and 220. The fourth communication node 108 can send information to the first communication node 102 via the connections 110c, 110b, and 110a and relayed by the intermediate nodes 106 and 104, in that order, as described at 225, 230, 235, and 240. Information used to establish the session keys for the TLS session can be exchanged accordingly.

In the examples in which the nodes 102 and 108 use RSA key transport scheme to establish the session keys, the fourth communication node 108 sends its public key certificate and other RSA-related information to the first communication node 102, e.g., via the connections 110c, 110b, and 110a and relayed by the intermediate nodes 106 and

104, in that order, similar to described at 225, 230, 235, and 240. The first communication node 102 validates the certificate of the fourth communication node 108, generates a random number (e.g., a number used once (nonce)), encrypts the nonce using the public key of the fourth communication node 102, and sends the encrypted nonce and other RSA-related information to the fourth communication node 108 via the connections 110a, 110b, and 110c and relayed by the intermediate nodes 104 and 106, in that order, similar to described at 205, 210, 215, and 220. The fourth communication node 108 decrypts the encrypted nonce using the private key of the fourth communication node 108 corresponding to the public key of the fourth communication node 108. Both the nodes 102 and 108 can use the nonce and other exchanged information to derive the two session keys at 245 and 250.

Accordingly, from a TLS protocol perspective, to exchange the information (e.g., public keys or ephemeral keys), when the first communication node 102 sends the "Client Hello" (e.g., the message) to the second communication node 104, instead of the second communication node 104 responding with a "Server Hello" as conventionally performed, the second communication node 104 sends a "Client Hello" to the third communication node 106, and then the third communication node 106 sends a "Client Hello" to the fourth communication node 108. When the fourth communication node 108 responds with a "Server Hello" to the third communication node 106, the third communication node 106 responds with a "Server Hello" to the second communication node 104, and then the second communication node 104 responds with a "Server Hello" to the first communication node 102. The first communication node 102 is conceptually unaware that the "Server Hello" is from the fourth communication node 108 in some examples, and similarly the fourth communication node 108 is unaware the "Client Hello" is from the first communication node 102. This allow nodes 102 and 108 to establish session keys $S_{AD}$ using the TLS process. The intermediate nodes 104 and 106 can operate in the E2E TLS scheme and/or retain backward compatibility with traditional P2P TLS scheme based on configuration parameters manage on intermediary nodes 104 and 106. The two endpoint nodes 102 and 108 may remain unaware of the E2E TLS protocol.

Accordingly, instead of establishing three session keys (e.g., session key sets S(102, 104), S(104, 106), and S(106, 108)) between the nodes 102 and 104, between the nodes 104 and 106, and between the nodes 106 and 108, respectively, one session key sets $S_{AD}$ (including one key for encryption referred to as a data encryption session key and one key for MAC generation referred to as the MAC session key) is established at 245 and 250.

At 255, the cryptographic circuit 120 of the first communication node 102 encrypts data using the data encryption session key derived at 245. The cryptographic circuit 120 can also generate a MAC using the MAC session key. At 260, the first communication node 102 (e.g., the network interface circuit 118) sends the encrypted data and the MAC to the second first communication node 102 via the connection 110a. At 265, the second communication node 104 (e.g., the network interface circuit 138) receives the encrypted data and the MAC originating from the first communication node 102 via the connection 110a and forwards the same encrypted data and the MAC to the third communication node 106 via the connection 110b. Forwarding the encrypted data and the MAC includes the network interface circuit 138 receiving one or more data packets carrying the encrypted data and the MAC and sends the one or more data packets to an Internet Protocol (IP) address of the third communication node 106. The second communication node 104, including the cryptography circuit 140, refrains from decrypting the encrypted data, re-encrypting the encrypted data, verifying the MAC associated with the encrypted data, or regenerating the MAC associated with the encrypted data.

At 270, the third communication node 106 (e.g., the network interface circuit 158) receives, from the second communication node 104 via the connection 110*b*, the encrypted data and the MAC originating from the first communication node 102 and forwards the same encrypted data and the MAC to the fourth communication node 108 via the connection 110*c*. Forwarding the encrypted data includes the network interface circuit 158 receiving one or more data packets carrying the encrypted data and the MAC and sends the one or more data packets to an Internet Protocol (IP) address of the fourth communication node 108. The third communication node 106, including the cryptography circuit 160, refrains from decrypting the encrypted data, re-encrypting the encrypted data, verifying the MAC associated with the encrypted data, or regenerating the MAC associated with the encrypted data.

At 275, the fourth communication node 108 (e.g., the network interface circuit 178) receives, from the third communication node 106 via the connection 110*c*, the encrypted data and the MAC originating from the first communication node 102. At 280, the cryptography circuit 180 decrypt the encrypted data using the data encryption session key derived at 250. The cryptography circuit 180 can also verify the MAC associated with the encrypted data, using the MAC session key.

In some examples, the fourth communication node 108 can determine additional data, sometimes in response to the data decrypted at 280. For example, the data decrypted at 280 can be an identifier, link, address, or query to some data (e.g., the additional data) stored in the fourth communication node 108 (e.g., a database). The fourth communication node 108 determines the additional data and provides the additional data to the first communication node 102. For example, the cryptography circuit 180 of the fourth communication node 108 encrypts the additional data using the data encryption session key and generates a MAC using the MAC session key. The fourth communication node 108 (e.g., the network interface circuit 178) sends the encrypted data and the MAC to the third first communication node 106 via the connection 110*c*. The third communication node 109 (e.g., the network interface circuit 158) receives the encrypted additional data and the MAC originating from the fourth communication node 108 via the connection 110*c* and forwards the same encrypted additional data and MAC to the second communication node 104 via the connection 110*b*. The third communication node 106, including the cryptography circuit 160, refrains from decrypting the encrypted additional data, re-encrypting the encrypted additional data, verifying the MAC associated with the encrypted additional data, or regenerating the MAC associated with the encrypted additional data. In some examples, the third communication node 106 (e.g., the cryptography circuit 160) can be provided by the node 102 or 108 the data encryption session key and can decrypt the encrypted additional data originating from the fourth communication node 108. In such examples, the third communication node 106 can relay the encrypted additional data and refrain from re-encrypting the encrypted additional data, verifying the MAC associated with the encrypted additional data, or regenerating the MAC associated with the encrypted additional data.

The second communication node 104 (e.g., the network interface circuit 138) receives, from the third communication node 106 via the connection 110*b*, the encrypted additional data and the MAC originating from the fourth communication node 108 and forwards the same encrypted additional data and the MAC to the first communication node 102 via the connection 110*a*. The second communication node 104, including the cryptography circuit 140, refrains from decrypting the encrypted additional data, re-encrypting the encrypted additional data, verifying the MAC associated with the encrypted additional data, or regenerating the MAC associated with the encrypted additional data. In some examples, the second communication node 104 (e.g., the cryptography circuit 140) can be provided by the node 102 or 108 the data encryption session key and can decrypt the encrypted additional data originating from the fourth communication node 108. In such examples, the second communication node 104 can relay the encrypted additional data and refrain from re-encrypting the encrypted additional data, verifying the MAC associated with the encrypted additional data, or regenerating the MAC associated with the encrypted additional data.

The first communication node 102 (e.g., the network interface circuit 118) receives, from the second communication node 104 via the connection 110*a*, the encrypted additional data and the MAC originating from the fourth communication node 108. The cryptography circuit 120 decrypt the encrypted additional data using the data encryption session key and verifies the MAC using the MAC session key.

Depending on the number of intermediary nodes in the TLS connection, the performance improvement of the method 200 can be significant. The more nodes in the communication path of the TLS connection, the greater the performance improvement in asymmetric key establishment and symmetric cryptography. The overhead for traditional P2P TLS protocol increases linearly as nodes are added to the communication path, whereas the overhead for E2E TLS protocol remains largely similar with no increase in processing power needed as more nodes are added to the communication path.

FIG. 3 is a method 300 for performing communication connection-based or channel-based communications, according to various arrangements. Referring to FIGS. 1-3, the method 300 can be performed by the system 100, including the communication nodes 102, 104, 106, and 108. The connection or channel (e.g., the TLS connection, the SSL connection, or SSL/TLS connection) is established among the communication nodes 102, 104, 106, and 108 as described herein. The method 300 can be applied to any connection or channel in which the communication between the nodes 102 and 108 involve at least one intermediate node (e.g., the nodes 104 and 106).

At 310, information is exchanged between a start node (e.g., the first communication node 102) and an end node (e.g., the fourth communication node 108), for example, via the intermediate nodes (e.g., the nodes 104 and 106). In some examples, exchanging the information between the start node and the end node includes sending a message from the start node to the at least one intermediate node (e.g., at 205), relaying the message from the intermediate node to the end node (e.g., at 210, 215, and 220), sending a response to the message from the end node to the at least one intermediate node (e.g., at 225), and relaying the response from the intermediate node to the start node (e.g., at 230, 235, and 240).

In some examples, the message includes a public key of the start node. In some examples, the response includes a public key of the end node. In some examples, the message includes an ephemeral key of the start node. In some examples, the response includes an ephemeral key of the end node. In the examples in which the RSA key transport is deployed, the response from the end node includes the TLS server RSA public key (there is no TLS client RSA public key of the start node for key transport). In the examples in which DH or EDCH key agreement is deployed, the message includes the client public key of the start node and the response includes the server static public key of the end node, where the server static public key is in a public key certificate. In the examples in which DHE or ECDHE key agreement is deployed, the message includes the client ephemeral key of the start node and the response includes the server ephemeral key of the end node, where the TLS server (e.g., the end node) signs its ephemeral public key with a static private key whose static public key is in a certificate that the TLS client (e.g., the start node) uses to verify that TLS server has signed its ephemeral key. PQC key establishment mechanisms (KEM) will operate similarly.

At 320, the session keys are establish based on the information for a connection including the start node, the end node, and the at least one intermediate node (e.g., the nodes 104 and 106). The session keys includes a data encryption session key and a MAC session key. In some examples, the connection is a TLS connection. In some examples, the session keys for the connection are established based on the information using a DH key agreement. In some examples, the session keys for the connection are established based on the information using an ECDH key agreement. In some examples, the session keys for the connection are established based on an ephemeral key agreement. In some examples, the session keys for the connection are established based on RSA key transport. At 330, the start node encrypts data using the data encryption session key. At 340, the start node generates a MAC using the MAC session key.

At 350, the at least one intermediate node relays the encrypted data and the MAC from the start node to the end node without the at least one intermediate node re-encrypting the data. In some arrangements, relaying via the at least one intermediate node the encrypted data from the start node to the end node without the at least one intermediate node re-encrypting the data includes receiving, by a first intermediate node (e.g., the second communication node 104) of the at least one intermediate node, the encrypted data and the MAC from the start node, sending, by the first intermediate node, the encrypted data and the MAC to a second intermediate node (e.g., the third communication node 106) of the at least one intermediate node without the first intermediate node re-encrypting the data or verifying the MAC, receiving, by the second intermediate node, the encrypted data and the MAC from the first intermediate node, and sending, by the second intermediate node, the encrypted data and the MAC to the end node without the second intermediate node re-encrypting the data or verifying the MAC.

In some examples, the at least one intermediate node relays the encrypted data to the end node without the at least one intermediate node decrypting the encrypted data encrypted by the start node. In some examples, the at least one intermediate node relays the encrypted data to the end node without the at least one intermediate node verifying the MAC associated with the encrypted data. In some examples, the at least one intermediate node relays the encrypted data to the end node without the at least one intermediate node regenerating the MAC associated with the encrypted data.

In some examples, the methods 200 and 300 can be used for a connection with deterministic routing or pathing, e.g., the nodes 102, 104, 106, and 108 are known. In some examples, the methods 200 can 300 can be triggered based on one or more of an identity of the first communication node 102 or the intended target (e.g., the fourth communication node 108) with whom the first communication node 102 communicates. For example, at 205, the message to the second communication node 104 can include one or more of the identity of the first communication node 102, an identifier for a type of communication (e.g., for a particular department of an enterprise, for a particular database), or an identifier of the fourth communication node 108, or so on. using one or more of the identity of the first communication node 102, an identifier for a type of communication, or an identifier of the fourth communication node 108, the second communication node 104 can select whether communication for one or more of the first communication node 102, the type of communication, or the fourth communication node 108 can use the methods 200 or 300. In response to determining that the methods 200 and 300 can be applied, the second communication node 104 forwards the message at 210. On the other hand, in response to determining that the methods 200 and 300 cannot be applied, the second communication node 104 responds to the message with a response instead of forwarding the response as described.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. At least one non-transitory processor-readable medium comprising processor-readable instructions such that, when executed, causes at least one processor to:

exchange information between a start node and an end node via a Transport Layer Security (TLS) connection between the start node, at least one intermediate node, and the end node;

establish, based on the information, one session key set for the TLS connection at the start node and the end node, the one session key set comprising a data encryption session key and a Message Authentication Code (MAC) session key;

encrypt at the start node data using the data encryption session key;

generate at the start node a MAC using the MAC session key; and relay, via the at least one intermediate node, the encrypted data from the start node to the end node without the at least one intermediate node (i) decrypting and re-encrypting the encrypted data and (ii) receiving the one session key set from the start node or the end node.

2. The non-transitory processor-readable medium of claim 1, wherein the data encryption session key is the only data encryption key for the TLS connection.

3. The non-transitory processor-readable medium of claim 1, wherein exchanging the information between the start node and the end node comprises:

sending a message from the start node to the at least one intermediate node;

relaying the message from the intermediate node to the end node;

sending a response to the message from the end node to the at least one intermediate node; and relaying the response from the intermediate node to the start node.

4. The non-transitory processor-readable medium of claim 3, wherein at least one of:

the message comprises a public key of the start node; or the response comprises a public key of the end node.

5. The non-transitory processor-readable medium of claim 3, wherein at least one of:

the message comprises an ephemeral key of the start node; or the response comprises an ephemeral key of the end node.

6. The non-transitory processor-readable medium of claim 1, wherein relaying via the at least one intermediate node the encrypted data from the start node to the end node without the at least one intermediate node re-encrypting the data comprises:

receiving, by a first intermediate node of the at least one intermediate node, the encrypted data and the MAC from the start node;

sending, by the first intermediate node, the encrypted data and the MAC to a second intermediate node of the at least one intermediate node without the first intermediate node decrypting and re-encrypting the data;

receiving, by the second intermediate node, the encrypted data and the MAC from the first intermediate node; and sending, by the second intermediate node, the encrypted data and the MAC to the end node without the second intermediate node decrypting and re-encrypting the data.

7. The non-transitory processor-readable medium of claim 1, wherein the one session key set for the TLS connection is established based on the information using a Diffie-Hellman (DH) key agreement or a Elliptic Curve Diffie-Hellman (ECDH) key agreement.

8. The non-transitory processor-readable medium of claim 1, wherein the one session key set for the TLS connection is established based on the information using Rivest, Shamir, and Adleman (RSA) key transport.

9. The non-transitory processor-readable medium of claim 1, wherein the one session key set for the TLS connection is established based on an ephemeral Diffie-Hellman (DIE), Elliptic Curve Diffie-Hellman with Ephemeral keys (ECDHE) key agreement, or a Post-Quantum Cryptography (PQC).

10. The non-transitory processor-readable medium of claim 1, wherein the at least one intermediate node relays the encrypted data to the end node without the at least one intermediate node decrypting the encrypted data encrypted by the start node.

11. The non-transitory processor-readable medium of claim 1, wherein the at least one intermediate node relays the encrypted data to the end node without the at least one intermediate node verifying the MAC associated with the encrypted data.

12. The non-transitory processor-readable medium of claim 1, wherein the at least one intermediate node relays the encrypted data to the end node without the at least one intermediate node regenerating the MAC associated with the encrypted data.

13. A system, comprising:

at least one memory; and at least one processor configured to:

exchange information between a start node and an end node via a Transport Layer Security (TLS) connection between the start node, at least one intermediate node, and the end node;

establish, based on the information, one session key set for the TLS connection at the start node and the end node, the one session key set comprising a data encryption session key and a Message Authentication Code (MAC) session key;

encrypt at the start node data using the session key data encryption;

generate at the start node a MAC using the MAC session key; and relay, via the at least one intermediate node, the encrypted data from the start node to the end node without the at least one intermediate node (i) decrypting and re-encrypting the encrypted data and (ii) receiving the one session key set from the start node or the end node.

14. A method, comprising:

exchanging information between a start node and an end node via a Transport Layer Security (TLS) connection between the start node, at least one intermediate node, and the end node;

establishing, based on the information, one session key set for the TLS connection at the start node and the end node, the one session key set comprising a data encryption session key and a Message Authentication Code (MAC) session key;

encrypting at the start node data using the data encryption session key;

generating at the start node a MAC using the MAC session key; and relaying, via the at least one intermediate node, the encrypted data from the start node to the end node without the at least one intermediate node (i) decrypting and re-encrypting the encrypted data and (ii) receiving the one session key set from the start node or the end node.

15. The method of claim 14, wherein the one session key set for the TLS connection is established based on an ephemeral Diffie-Hellman (DHE), Elliptic Curve Diffie-Hellman with Ephemeral keys (ECDHE) key agreement, or a Post-Quantum Cryptography (PQC).

16. The method of claim 14, further comprising verifying, by the end node, the MAC associated with the start node using the MAC session key.

17. The method of claim 14, wherein exchanging the information between the start node and the end node comprises:

sending a message from the start node to the at least one intermediate node;

relaying the message from the intermediate node to the end node;

sending a response to the message from the end node to the at least one intermediate node; and relaying the response from the intermediate node to the start node.

18. The method of claim 14, wherein relaying via the at least one intermediate node the encrypted data from the start node to the end node without the at least one intermediate node re-encrypting the data comprises:

receiving, by a first intermediate node of the at least one intermediate node, the encrypted data and the MAC from the start node;

sending, by the first intermediate node, the encrypted data and the MAC to a second intermediate node of the at least one intermediate node without the first intermediate node decrypting and re-encrypting the data;

receiving, by the second intermediate node, the encrypted data and the MAC from the first intermediate node; and sending, by the second intermediate node, the encrypted data and the MAC to the end node without the second intermediate node decrypting and re-encrypting the data.

19. The method of claim 14, further comprising:

decrypting, by the end node, the encrypted data using the data encryption session key;

in response to decrypting the encrypted data, encrypting, by the end node, additional data using the data encryption session key; and relaying, via the at least one intermediate node, the encrypted additional data from the end node to the start node without the at least one intermediate node decrypting and re-encrypting the additional data.

20. The method of claim 14, wherein the at least one intermediate node relays the encrypted data to the end node without the at least one intermediate node verifying and regenerating the MAC associated with the encrypted data.

* * * * *